(12) United States Patent
Zhao et al.

(10) Patent No.: US 11,554,364 B2
(45) Date of Patent: Jan. 17, 2023

(54) ACTIVE METAL CATALYST

(71) Applicant: UT-Battelle, LLC, Oak Ridge, TN (US)

(72) Inventors: Xianhui Zhao, Oak Ridge, TN (US); James W. Klett, Oak Ridge, TN (US); Soydan Ozcan, Oak Ridge, TN (US); Halil Tekinalp, Oak Ridge, TN (US); Justin Figley, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 217 days.

(21) Appl. No.: 17/120,408

(22) Filed: Dec. 14, 2020

(65) Prior Publication Data

US 2022/0184588 A1 Jun. 16, 2022

(51) Int. Cl.
| | | |
|---|---|---|
| *B01J 29/072* | (2006.01) | |
| *B01J 23/04* | (2006.01) | |
| *B01J 33/00* | (2006.01) | |
| *B01J 37/00* | (2006.01) | |
| *B01J 37/02* | (2006.01) | |
| *B29C 64/165* | (2017.01) | |
| *B33Y 10/00* | (2015.01) | |
| *B33Y 70/10* | (2020.01) | |
| *B33Y 40/20* | (2020.01) | |
| *B01J 37/08* | (2006.01) | |
| *B29K 1/00* | (2006.01) | |
| *B29C 64/112* | (2017.01) | |
| *B01J 23/755* | (2006.01) | |

(Continued)

(52) U.S. Cl.
CPC ............ *B01J 29/072* (2013.01); *B01J 23/04* (2013.01); *B01J 33/00* (2013.01); *B01J 37/0018* (2013.01); *B01J 37/0217* (2013.01); *B01J 37/082* (2013.01); *B29C 64/165* (2017.08); *B33Y 10/00* (2014.12); *B33Y 40/20* (2020.01); *B33Y 70/10* (2020.01); *B01J 23/755* (2013.01); *B22F 10/16* (2021.01); *B29C 64/112* (2017.08); *B29C 71/02* (2013.01); *B29K 2001/08* (2013.01); *Y02P 30/20* (2015.11)

(58) Field of Classification Search
CPC . B01J 29/072; B01J 33/00; B01J 23/04; B01J 23/755; B01J 37/0217; B01J 37/082; B01J 37/0018; B33Y 70/10; B33Y 10/00; B33Y 40/20; B29C 64/165; B29C 64/112; B29C 71/02; B22F 10/16; B29K 2001/08; Y02P 30/20
USPC ........................................................ 264/129
See application file for complete search history.

(56) References Cited

U.S. PATENT DOCUMENTS

| | | | |
|---|---|---|---|
| 10,618,042 B1 * | 4/2020 | Zhao | B01J 35/1014 |
| 2020/0308062 A1 * | 10/2020 | Klett | C04B 35/48 |
| 2021/0071088 A1 * | 3/2021 | Liu | B01J 35/026 |

* cited by examiner

*Primary Examiner* — Joseph S Del Sole
*Assistant Examiner* — Lawrence D. Hohenbrink, Jr.
(74) *Attorney, Agent, or Firm* — Warner Norcross + Judd LLP

(57) ABSTRACT

A method of forming a catalyst is provided herein. The method comprises combining a binder, a support, and an active metal to form a slurry composition. The method further comprises applying the slurry composition using an additive manufacturing process to form a green part. The method further comprises exposing the green part to heat at a temperature of from about 10° C. to about 150° C. to form the hardened part. The method further comprises applying a ceramic-based coating material to the hardened part to form the catalyst.

19 Claims, 3 Drawing Sheets

(51) Int. Cl.
*B22F 10/16* (2021.01)
*B29C 71/02* (2006.01)

ACTIVE METAL CATALYST

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE DISCLOSURE

The present invention relates to a method of forming a catalyst, and more particularly to catalysts including active metals.

BACKGROUND OF THE DISCLOSURE

The increased consumption of fossil fuels in the world causes global issues such as environmental pollution and climate change. In recent years, the solid wastes derived from industrial and agricultural resources (e.g., plastic wastes and biomass residues) have shown potential to partially replace fossil fuels to meet the increasing energy demand. Pyrolysis and catalytic cracking are pathways to convert solid wastes into liquid hydrocarbon fuels. The liquid (e.g., bio-oil) generated from the pyrolysis stage has a high viscosity, acidity and instability due to its high oxygen content. The bio-oil can be upgraded through the catalytic cracking stage into liquid hydrocarbon fuels.

Zeolites have shown a promising performance for bio-oil upgrading due to their ability of removing oxygen from the bio-oil. Nevertheless, high coking yield is observed in the zeolite used in bio-oil deoxygenation, resulting in the rapid catalyst deactivation. Ni modified zeolite exhibits a higher hydrocarbon yield due to the dehydrogenating activity of nickel, compared to pure zeolite. In addition, nickel is easily accessible and has a low cost.

Traditional industrial catalysts (e.g., pellets) have mass transfer limitation, heat transfer limitation, and high pressure drop in continuous flow reactors. Conventional monolith catalysts are synthesized by coating the active phase on the monolith body via a wet impregnation method. The monolith body is typically synthesized using a conventional extrusion process. However, the wet impregnation takes time to process. In addition, the extrusion in the conventional monolith synthesis process is conducted with specially designed extruders and typically involves five steps (drying, adding additives, extrusion, drying, and firing).

Complex structured catalysts (e.g., monolith) with controlled geometry can be 3D-printed easily and rapidly to address the aforementioned issues. The 3D printing technology is distinguished from conventional manufacturing technologies such as casting and machining due to its ability to handle complex shapes with a high design flexibility. The 3D printing technology has low energy consumption and waste generation. In recent years, 3D printing technology is in demand for fabricating complex geometries with unique structural and mechanical properties. Compared to the conventional extrusion process, the 3D printing technology allows for precise fabrication of parts with desired properties and configurations. Accordingly, there remains a need for an improved catalyst formed using additive manufacturing that exhibits improved properties.

SUMMARY OF THE DISCLOSURE

A method of forming a catalyst is provided herein. The method comprises combining a binder, a support, and an active metal to form a slurry composition. The method further comprises applying the slurry composition using an additive manufacturing process to form a green part. The method further comprises exposing the green part to heat at a temperature of from about 10° C. to about 150° C. to form the hardened part. The method further comprises applying a ceramic-based coating material to the hardened part to form the catalyst.

Another method of forming a catalyst is provided herein. The method comprises combining a binder comprising sodium silicate and hydroxyethyl cellulose, a support, and an active metal to form a slurry composition. The method further comprises applying the slurry composition using an additive manufacturing process to form a green part. The method further comprises exposing the green part to heat at a temperature of from about 10° C. to about 150° C. to form the hardened part. The method further comprises applying a ceramic-based coating material to the hardened part to form the catalyst.

In various non-limiting embodiments, methods and formulations are provided for making a mixed metal oxide 3D printed catalyst. The methods can include (a) combining the powder with a binder, ethanol, and water to produce a mixture; (b) 3D printing the mixture to produce a wet structured part; (c) coating the structured part with cerakote solution and acetone; and (d) drying and calcining the structured part to produce the mixed metal oxide 3D printed catalyst. For example, the mixed metal oxide 3D printed catalyst may be a zeolite supported Ni catalyst.

In some cases, the mixed metal oxide 3D printed catalyst can include an active metal selected from nickel (Ni), copper (Cu), magnesium (Mg), zinc (Zn), iron (Fe), cobalt (Co), titanium (Ti), platinum (Pt), palladium (Pd), scandium (Sc), rhodium (Rh), lanthanum (La), yttrium (Y) and gold (Au). The 3D printed metal oxide can include a mixed metal oxide catalyst. In some cases, the mixed metal oxide 3D printed catalyst includes a combination of metals selected from Ni—Cu, Ni—Mg, Ni—Zn, Ni—Fe, Ni—Co, Ni—Ti, Ni—Pt, Ni—Pd, Ni—Sc, Ni—Rh, Ni—La, Ni—Y, Ni—Au and or any combination of these. In some cases, the 3D printed metal oxide includes a support selected from zeolite, $SiO_2$, $Al_2O_3$, $SiO_2/Al_2O_3$, $ZrO_2$, $CeO_2$, $Ce_{0.6}Zr_{0.4}O_2$, and combinations thereof.

The methods can include using various amounts of binder, ethanol and water to create a stable 3D printed catalyst. In some cases, the binder is hydroxyethyl cellulose. The methods can include coating the structured part using various amounts of cerakote solution and acetone. In some cases, the cerakote solid solution is 8 wt %.

Catalysts can be printed with customized shapes including monolith (with desired channel structures such as square, round, triangle, and hexagonal), core-shell, 10-hole ring, foam, and hollow sphere. Monolith bodies can be tuned on the channel size, wall thickness, and mechanical properties through the 3D printing technology. The 3D printed catalysts (e.g., $Cu/Al_2O_3$) exhibited a high catalytic performance and recyclability.

These and other features and advantages of the present invention will become apparent from the following description of the invention, when viewed in accordance with the appended claims.

BRIEF DESCRIPTION OF THE DRAWINGS

The accompanying drawings, which are incorporated in and form part of the specification, illustrate various

DETAILED DESCRIPTION

Figure 1:
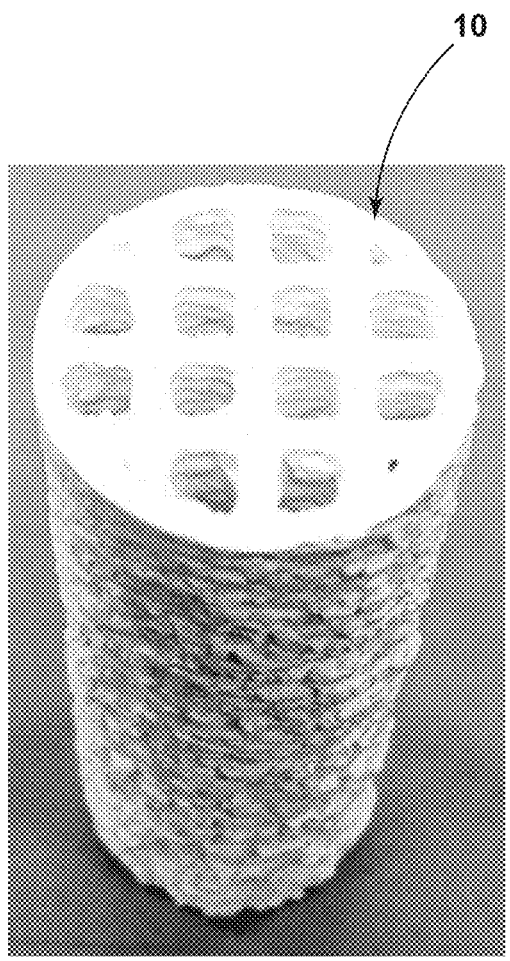
FIG. 1 illustrates a perspective view of a non-limiting embodiment of a hardened part.
Figure 2:
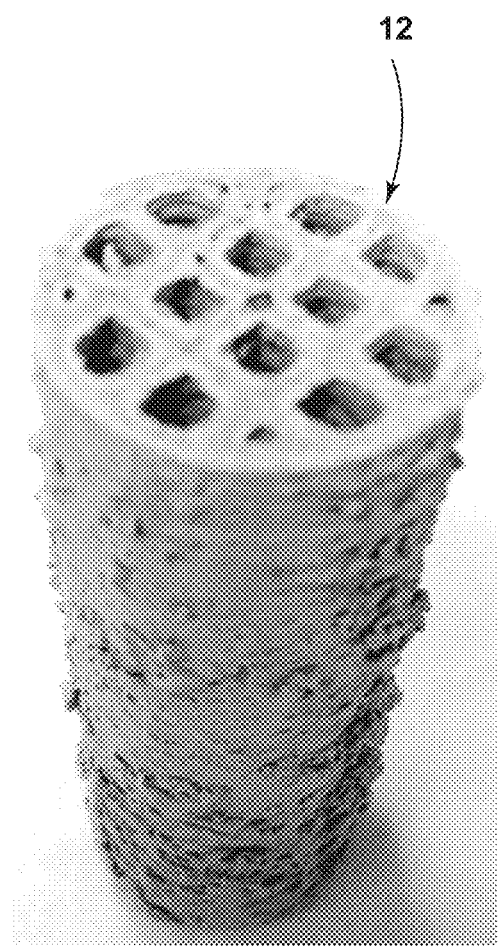
FIG. 2 illustrates a perspective view of a non-limiting embodiment of the catalyst.

A method of forming a catalyst is provided herein. The method is suitable for use with an additive manufacturing process. In particular, the method allows for printing a slurry composition comprising a binder, a support, and an active metal, as exemplified by the embodiments herein, to form "green parts," having complex cross-sections or configurations that would not be possible using conventional methods of forming catalysts. With reference to FIGS. 1 and 2, the green part is then dried to form a hardened part 10, and a coating material is applied to the hardened part 10 to form the catalyst 12. The method can be used to form catalysts for converting solid wastes (e.g. plastic waste and biomass residue) into chemicals (e.g. alcohol) and hydrocarbon liquid fuels, converting landfill gas (e.g. $CH_4$ and $CO_2$) into syngas (mainly $H_2$ and CO), converting syngas into diesel fuel, photoreforming of solid wastes into $H_2$, and catalytic elimination of environmental pollutants (e.g. CO and nitrogen oxides).

Application of the slurry composition may be referred to as "printing." The terms "applying" or "printing" may be performed by any suitable apparatus understood in the art of additive manufacturing (AM) and/or three-dimensional (3D) printing. ASTM Designation F2792-12a, which is titled "Standard Terminology for Additive Manufacturing Technologies" and herein incorporated by reference in its entirety, defines additive manufacturing as "a process of joining materials to make objects from 3D model data, usually layer upon layer, as opposed to subtractive manufacturing methodologies," and 3D printing as "the fabrication of objects through the deposition of a material using a print head, nozzle, or another printer technology."

Examples of 3D printers include extrusion additive manufacturing printers, liquid additive manufacturing printers, fused filament fabrications printers, fused deposition modeling printers, direct ink deposition printers, material jet printers, polyjet printers, ink-jetting printers, material jetting printers, syringe extrusion printers, and combinations thereof. Typically, an extrusion-type printer is utilized for applying the slurry composition on the substrate. In various embodiments, the extrusion-type printer comprises the nozzle. The nozzle defines an orifice having an inside diameter of from about 10 nm to about 100 mm.

The slurry composition may be applied to any type of substrate. Typically, the substrate is adapted to support the three-dimensional green part during the method of forming. However, the substrate itself may be supported (e.g. by a table or bench), such that the substrate may be a flexible layer or coating (e.g. a release coating, paint, etc.) and need not have inherent rigidity. Likewise, the substrate may be a floor or other surface of a structure, or may be a natural surface (e.g. the ground).

As described above, the slurry composition is suitable for use with additive manufacturing/3D printing. As readily understood in the art of additive manufacturing (AM) and/or three-dimensional (3D) printing, the at least one layer formed by printing the slurry composition is not limiting, as the three-dimensional article may comprise any number of layers.

As introduced above, the method comprises combining the binder, the support, and the active metal to form the slurry composition. The binder, the support, and the active metal may be combined using any method understood in the art. The binder, the support, and the active metal may be combined in any order and over any number of steps. In various embodiments, the binder, the support, and the active metal are combined under agitation using a mixing apparatus for at least 1 minute, optionally at least 3 minutes, or optionally at least 5 minutes.

In certain embodiments, combining the binder, the support material, and the active metal, comprises the step of combining the binder and the active metal to form a mixture and then the step of combining the mixture and the support material to form the slurry composition. In these and other embodiments, the step of combining the binder and the active metal to form the mixture may further comprise combining a solvent. Likewise, in these and other embodiments, the step of combining the mixture and the support to form the slurry composition may further comprise combining the solvent.

The method further comprises applying the slurry composition using an additive manufacturing process to form the green part. In various embodiments, applying the slurry composition using an additive manufacturing process comprises dispensing the slurry composition through a nozzle to form a first layer on the substrate, and dispensing the slurry composition through the nozzle to form a second layer on the first layer to form two or more layers of the green part. In specific embodiments, applying the slurry composition using the additive manufacturing process to form the green part comprises printing at least one layer of the slurry composition to form the green part on the substrate. The slurry composition may be printed using a Fusion3 Printer with a nozzle inside diameter of 1.2 mm, and outside diameter of 1.8 mm, commercially available from Fusion3 Design, LLC of Greensboro, N.C.

The green part formed by the additive manufacturing process may be particulate with a cross-sectional size in the range 0.1-50 mm or the shaped units may be in the form of monoliths, e.g. honeycombs, with cross sections in the range 100-1000 mm. The aspect ratio, i.e. length/width, for the particulate shaped units or monolithic shaped units may be in the range 0.5 to 5.

There is almost no limit to the geometry of the catalyst 12 shaped units that may be fabricated using the additive manufacturing process. The complexity may range from skeletal frame and lattice or lace work structures to multi-featured and facetted robust structures. For example, the shaped unit may be in the form of wire-frame or skeletal framework structures containing a void space within and which may have multiple internal strengthening rods, or the shaped unit may be a honeycomb in any form or a solid unit, such as a cylinder, which may be configured with domed ends, multiple lobes, and/or through holes.

The shaped units comprise one or more through holes, which may be circular, ellipsoid, or polygonal, e.g. triangular, square, rectangular, or hexagonal, in cross section. The through holes may comprise two or more through holes running parallel, or non-parallel holes running through the shaped unit at various angles, to a longitudinal axis of the shaped unit.

The method further comprises exposing the green part to heat at a temperature of from about 10° C. to about 150° C., optionally from about 20° C. to about 100° C., or optionally from 20° C. to about 40° C., to form the hardened part 10. The green part may be exposed to heat for a time period of at least 1 minute, optionally at least 1 hour, or optionally at least 2 hours. In certain embodiments, the step of exposing the green part to heat comprises exposing the green part to heat at a temperature of from about 20° C. to about 40° C. for a time period of at least 2 hours.

The method further comprises applying the coating material to the hardened part 10 to form the catalyst 12. In various embodiments, the method further comprises applying a ceramic-based coating material to the hardened part 10 to form the catalyst 12. The coating material or ceramic-based coating material may be applied using any method known in the art suitable for applying a coating to a part. Non-limiting examples include spraying the hardened part 10 with the coating material, submersing the hardened part 10 within the coating material, or the like. It is to be appreciated that the green part, the hardened part 10, or the coating material may be coated with an active metal, same or different from the active metal of the slurry composition.

In various embodiments, the step of applying the ceramic-based coating material to the hardened part 10 comprises spraying the hardened part 10 with the ceramic-based coating material. The hardened part 10 may be sprayed with the ceramic-based coating material for a time period of from about 0.1 to about 100 seconds, optionally from about 1 to about 20 seconds, or optionally from about 1 to about 6 second(s).

In these and other embodiments, the step of applying the ceramic-based coating material to the hardened part 10 comprises exposing the coating material to heat at a temperature of from about 10° C. to about 150° C., optionally from about 20° C. to about 100° C., or optionally from 20° C. to about 40° C. for a time period of at least 1 minute, optionally at least 1 hour, or optionally at least 2 hours.

In these and other embodiments, the step of applying the ceramic-based coating material to the hardened part 10 comprises calcining the hardened part 10 by exposing the ceramic-based coating material to heat at a temperature of from about 400° C. to about 800° C., optionally from about 400° C. to about 700° C., or optionally from about 450° C. to about 600° C. at a rate of from about 1° C./min to about 20° C./min, optionally from about 1° C./min to about 15° C./min, or optionally from about 5° C./min to about 15° C./min, to form the catalyst 12.

The components of the slurry composition and the ceramic-based coating material will now be described. The binder may be any binder known in the art suitable for use in additive manufacturing. The binder may be selected from the group of a cellulose-based binder (e.g., hydroxyethyl cellulose), a silicate-based binder (e.g., sodium silicate), a gel-based binder, an acetate-based binder (e.g., sodium acetate), a carbonate-based binder (e.g., polypropylene carbonate), a hydroxy-functional binder (e.g., phenolic binder, a furfuryl alcohol, a polyethylene glycol), a photo-curable binder (e.g., photo-curable acrylic), and combinations thereof. The slurry may comprise the binder in an amount of from about 0.1 to about 50, optionally from about 0.5 to about 30, or optionally from about 1 to about 30 wt. % based on a total weight of the slurry composition.

In various embodiments, the binder comprises a cellulose-based binder, a silicate-based binder, or a combination thereof. The cellulose-based binder may comprise hydroxyethyl cellulose, carboxymethyl cellulose, methyl cellulose, ethyl cellulose, micro-fibrillated cellulose, nanocellulose, or combinations thereof. The silicate-based binder may comprise sodium silicate, bentonite clay, aluminate silicate, potassium silicate, lithium silicate, or combinations thereof. In various embodiments, the silicate-based binder may be further defined as a sodium silicate liquid.

In certain embodiments, the binder comprises sodium silicate and hydroxyethyl cellulose. The mass ratio of the sodium silicate to the hydroxyethyl cellulose may be from about 1 to about 15, optionally from about 2 to about 10, or optionally from about 3 to about 8. Non-limiting examples of suitable hydroxyethyl cellulose are commercially available from Union Carbide Chemicals and Plastics Company Inc. of Houston, Tex. under the trade name QP-30000-H. Non-limiting examples of suitable sodium silicate are commercially available from Science Company of Lakewood, Colo.

The support may be any support structure known in the art suitable for use in additive manufacturing. In various embodiments, the support comprises a zeolite, $SiO_2$, $Al_2O_3$, $SiO_2/Al_2O_3$, $ZrO_2$, $CeO_2$, $Ce_{0.6}Zr_{0.4}O_2$, or combinations thereof. In certain embodiments, the support comprises the zeolite. The zeolite may comprise ZSM-5 zeolites, SBA-15, and USY zeolites. The zeolite may have a particle size, $D_{50}$, of less than 300 μm, optionally less than 200 μm, or optionally less than 100 μm. The mass ratio of the zeolite to the binder may be from about 0.1 to about 1.5, optionally from about 0.1 to about 1.2, or optionally from about 0.1 to about 1.0. The slurry composition may comprise the support in an amount of from about 1 to about 50 wt. %, optionally from about 5 to about 50 wt. %, or optionally from about 10 to about 50 wt. %, based on a total weight of the slurry composition. Non-limiting examples of suitable zeolites are commercially available from Sigma-Aldrich of St. Louis, Mo.

The active metal may be any metal or any compound or chemical moiety associated with the active metal that exhibits catalytic activity. The active metal may comprise nickel (Ni), copper (Cu), magnesium (Mg), zinc (Zn), iron (Fe), cobalt (Co), titanium (Ti), platinum (Pt), palladium (Pd), scandium (Sc), rhodium (Rh), lanthanum (La), yttrium (Y), gold (Au), or combinations thereof. For example, the active metal may comprise a combination of metals, such as Ni—Cu, Ni—Mg, Ni—Zn, Ni—Fe, Ni—Co, Ni—Ti, Ni—Pt, Ni—Pd, Ni—Sc, Ni—Rh, Ni—La, Ni—Y, Ni—Au, or combinations thereof. In certain embodiments, the active metal comprises $Ni(NO_3)_2.6H_2O$. In various embodiments, the mass ratio of the $Ni(NO_3)_2.6H_2O$ to the binder is from about 0.1 to about 10, optionally from about 1 to about 8, or optionally from about 1 to about 6. The slurry composition may comprise the active metal in an amount of from about 1 to about 50, optionally from about 1 to about 40, or optionally from about 1 to about 30 wt. % based on a total weight of the slurry composition. Non-limiting examples of suitable $Ni(NO_3)_2.6H_2O$ are commercially available from Sigma-Aldrich of Saint Louis, Mo.

The carrier may comprise a solvent. Examples of suitable solvents include, but are not limited to, water, an inorganic solvent, an organic solvent, or combinations thereof. In certain embodiments, the carrier comprises water. It is be appreciated that carriers comprising water may be suitable for printing materials that are flammable to minimize the occurrence of unintended ignition of the composition. In various embodiments, the carrier comprises water and an organic solvent. Examples of suitable organic solvents include, but are not limited to, ethanol, methanol, butanol, propanol, isopropanol, acetone, methyl ethyl ketone, methyl isobutyl ketone, methyl amyl ketone, ethyl acetate, butyl acetate, and combinations thereof. Examples of suitable inorganic solvents include, but are not limited to, ammonia, carbon tetrachloride, carbon disulfide, and combinations thereof.

In certain embodiments, the solvent comprises ethanol, water, methanol, acetone, propanol, isopropanol, butanol, or combinations. The mass ratio of the ethanol to hydroxyethyl cellulose is from about 5 to about 50, optionally from about 10 to about 40, or optionally from about 15 to about 30. The mass ratio of the water to hydroxyethyl cellulose is from about 5 to 50, optionally from about 5 to about 40, or optionally from about 10 to about 30. The slurry may comprise the solvent in an amount of from about 15 to about 85, optionally from about 20 to about 80, or optionally from about 25 to about 75 wt. % based on a total weight of the slurry.

The slurry composition may comprise a carrier with the carrier comprising the binder and the solvent. The carrier may have a viscosity of at least 0.001 cP at normal temperature and pressure in accordance with ASTM D7867-13. The phrase "normal temperature and pressure" means air at 20° C. and 1 atm. The carrier is adapted to be flowable through the nozzle. The term "flowable" with regard to the nozzle means that the carrier can pass through the orifice of the nozzle. The carrier may have a viscosity of at least 0.001 cP, optionally at least 1 cP, optionally at least 100 cP, or optionally at least 200 cP, at normal temperature and pressure in accordance with ASTM D7867-13. The carrier may have a viscosity of no greater than 15,000 cP, optionally no greater than 7,500 cP, or optionally no greater than 5,000 cP, at normal temperature and pressure in accordance with ASTM D7867-13. In various embodiments, the carrier is in the form of a liquid, a gel, or a paste such that the slurry composition is also in the form of a liquid, a gel, or a paste. In certain embodiments, the slurry composition is not a flowable powder.

The carrier may comprise a thickener. The thickener provides a rheological advantage to thicken the slurry composition such that it flows similar to a liquid rather than similar to wet sand. The thickener may be selected from the group of a gel-based thickener, wax-based thickener, a silicone-based thickener, and combinations thereof. The gel-based thickener may be a sol-gel. The wax-based thickener may be a polyethylene glycol. The silicone-based thickener comprises may be a siloxane.

The coating material may be any coating known in the art suitable for coating catalysts. Non-limiting examples of the coating material include, but are not limited to, ceramic-based, polymer-based, metal-based, glass-based, or combinations thereof. The coating material may further comprise a solvent, same or different from the solvents described above.

The ceramic-based coating material may be any ceramic-based coating known in the art suitable for coating catalysts. Non-limiting examples of the ceramic-based coating material include, but are not limited to, cerakote, alumina, titania, zirconia, silicon nitride, silicon carbide, boron carbide, or combinations thereof. In certain embodiments, the ceramic-based coating material may comprises cerakote. The ceramic-based coating material may further comprise a solvent, same or different from the solvents described above. In certain embodiments, the solvent may comprise acetone. The ceramic-based coating material may have a solids content of from about 2 to about 20 wt. %, optionally from about 3 to about 15 wt. %, or optionally from about 4 to about 12 wt. %.

In an exemplary embodiment, hydroxyethyl cellulose, sodium silicate liquid, $Ni(NO_3)_2 \cdot 6H_2O$, ethanol, and water are combined to form the mixture under mixing agitation for about 5 minutes. The slurry composition may then be let to rest, without agitation, for about 1 hour to allow the mixture to increase in viscosity.

In these exemplary embodiments, the mixture, the zeolite, and ethanol are combined to form the slurry composition. The slurry composition may then be loaded into a syringe of the Fusion3 Printer with a nozzle inside diameter of 1.2 mm, and outside diameter of 1.8 mm. A 3×3 cross green part may be printed with an outside diameter of 0.8 inch and height of 2 inch. The green part may be dried in air at room temperature for at least 2 hours to form the hardened part 10. The hardened part 10 may then be coated with a solution of cerakote and acetone (8% w/w). The hardened part 10 may be coated for a time period of 2 seconds, and repeated for another time period of 2 seconds to form the catalyst 12. The catalyst 12 may then be dried at room temperature overnight and then calcined at 500° C. for 4 hour.

EXAMPLES

Example 1: Catalyst Formulation

In Example 1, comparative and exemplary catalysts were formed. Comparative mixture and exemplary mixture formulations are shown in Table 1 below. Procedures for forming the comparative mixture and exemplary mixture follow Table 1. Comparative catalyst and exemplary catalyst formulations are shown in Table 2 below. Procedures for forming the comparative catalyst and exemplary catalyst follow Table 2.

TABLE 1

| Components | Formulations | |
|---|---|---|
| | Comparative Mixture | Exemplary Mixture |
| Solvent I | 90 grams | 90 grams |
| Binder I | 4 grams | 4 grams |
| Binder II | 27.2 grams | 27.2 grams |
| Active Metal I | — | 11.76 grams |
| Solvent II | 82.8 grams | 82.8 grams |
| TOTAL | 204 grams | 215.76 grams |

Comparative Mixture Procedure 90 g of ethanol was added in a plastic container. A magnetic stir bar was added in the center of the plastic container. While stirring at approximately 500 rpm, 4 g of hydroxyethyl cellulose (HEC, QP-30000-H, cellosize, Union Carbide Chemicals and Plastics Company Inc., Danbury, C.T., white powders) were added slowly and gradually on the edge of the solution. Next, 27.2 g of sodium silicate liquid (CSS 1136, $Na_2O(SiO_2)_x$, CAS #1344-09-8, assay is 36.9-38.1%, Science Company, Lakewood, Colo. 80227) was added slowly and gradually. 82.8 g of $H_2O$ was added slowly and gradually. After stirring for approximately 5 minutes until the water bubbles can be seen, the magnetic stir bar was taken out. The plastic container was kept closed in air at room temperature for approximately 1 hour to form the comparative mixture.

Exemplary Mixture Procedure 90 g of ethanol was added in a plastic container. A magnetic stir bar was added in the center of the plastic container. While stirring at approximately 500 rpm, 4 g of hydroxyethyl cellulose (HEC, QP-30000-H, cellosize, Union Carbide Chemicals and Plastics Company Inc., Danbury, C.T., white powders) were added slowly and gradually on the edge of the solution. Next, 27.2 g of sodium silicate liquid (CSS 1136, $Na_2O(SiO_2)_x$, CAS #1344-09-8, assay is 36.9-38.1%, Science Company, Lakewood, Colo. 80227) was added slowly and gradually. 11.76 g $Ni(NO_3)_2 \cdot 6H_2O$ was dissolved in 82.8 g of $H_2O$ completely, and then added slowly and gradually. After stirring for approximately 5 minutes until the water bubbles can be seen, the magnetic stir bar was taken out. The plastic container was kept closed in air at room temperature for approximately 1 hour to form the exemplary mixture.

TABLE 2

Formulations

|  | Comparative Catalyst | Exemplary Catalyst |
|---|---|---|
| Comparative Mixture | 80 grams | — |
| Exemplary Mixture | — | 137.49 grams |
| Support Material I | 30 grams | 48.75 grams |
| Solvent I | 4.8 grams | 7.8 grams |
| TOTAL | 114.8 grams | 194.04 grams |

Comparative Catalyst Procedure 80 g of the comparative mixture was added in another plastic container. 30 g of zeolite powders (CAS number: 1318-02-1, particle size: <45 μm, Sigma-Aldrich) were added slowly and gradually (adding some zeolite, and then mixing, repeating this process). Next, 4.8 g of ethanol was added in slowly and gradually to form a comparative slurry composition. After the comparative slurry composition was obtained, it was loaded into the syringe of a Fusion3 Printer with a nozzle inside diameter of 1.2 mm, and outside diameter of 1.8 mm. A 3×3 cross comparative green part was then 3D printed with an outside diameter of 0.8 inch and height of 2 inch. A piece of Wax Paper (microwave safe, Topco Associates LLC, Elk Grove Village, Ill.) was placed on a glass mirror, heated at 80° C. The comparative green part was dried in air at room temperature for at least 2 hours until it looked dry to form a comparative hardened part. Then, the comparative hardened part was coated with cerakote solution in acetone with 8 wt % of solid to form the comparative catalyst. The coating time was 2 seconds, and only repeated once. The comparative catalyst was dried at room temperature overnight and then calcined at 500° C. for 4 hours.

Exemplary Catalyst Procedure 137.49 g of the exemplary mixture was added in a plastic container. 48.75 g of zeolite powder (CAS number: 1318-02-1, particle size: <45 μm, Sigma-Aldrich) was then added into the plastic container slowly and gradually (adding some zeolite, and then mixing, repeating this process). Next, 7.8 g of ethanol was added in the mixture slowly and gradually. After the exemplary slurry was obtained, it was loaded into the syringe of a Fusion3 Printer with a nozzle inside diameter of 1.2 mm, outside diameter of 1.8 mm. A piece of Wax Paper (microwave safe, Topco Associates LLC, Elk Grove Village, Ill.) was placed on a glass mirror, heated at 80° C. A 3×3 cross exemplary green part was 3D printed with an outside diameter of 0.8 inch and height of 2 inch. The exemplary green part was dried in air at room temperature for at least 2 hours until it looked dry to form the exemplary hardened part. Then, the exemplary hardened part was coated with cerakote solution in acetone with 8 wt % of solid to form the exemplary catalyst. The coating time was 2 seconds, repeated once. The exemplary catalyst was dried at room temperature overnight and then calcined at 500° C. for 4 hours.

Example 2: Catalyst Characterization

In Example 2, the comparative and exemplary catalysts of Example 1 were characterized.

Compression Testing

The compression testing was performed on a servo-hydraulic testing machine with a 136 kg (i.e., 300 lb) load cell to determine its mechanical property. A Universal MX5.Vi software was used for parameter setting and data acquisition. The comparative and exemplary catalysts were placed and compressed between two metal plates. The strain rate and scan rate were 0.0254 mm/s and 20 point/s, respectively. The compression force was applied in the axial direction of the catalysts until each of the catalysts were broken. The results can be found in Table 3 below.

TABLE 3

Preliminary Results Testing

|  | Diameter (mm) | Height (mm) | Compressive strength (MPa) | Failure strain (%) |
|---|---|---|---|---|
| Comparative Catalyst (3 × 3 cross) | 20.3 | 50.8 | 1.2 | 2.2 |
| Exemplary Catalyst (3 × 3 cross) | 20.3 | 50.8 | 1.0 | 1.9 |
| Exemplary Catalyst (Solid) | 20.3 | 25.4 | 0.3 | 2.8 |

The compressive strength and failure strain of the exemplary catalyst were lower than those of the comparative catalyst.

Surface Morphology

Figure 3A:
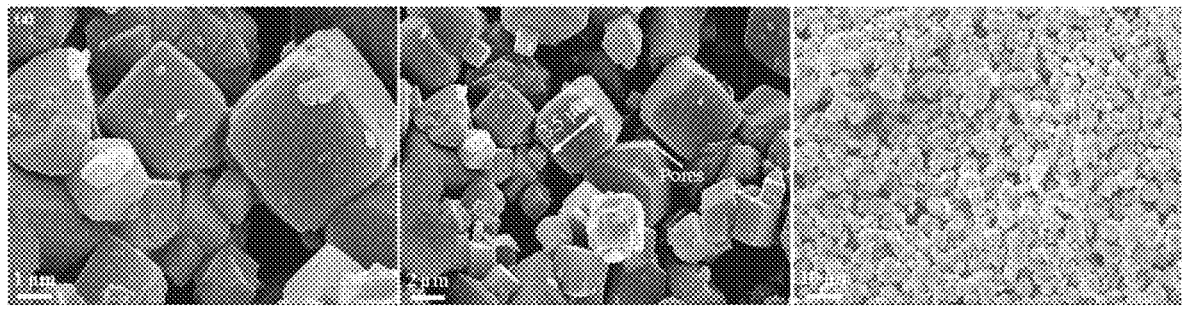
FIG. 3A illustrates SEM scans of surface morphologies of a non-limiting embodiment of a comparative catalyst.
Figure 3B:
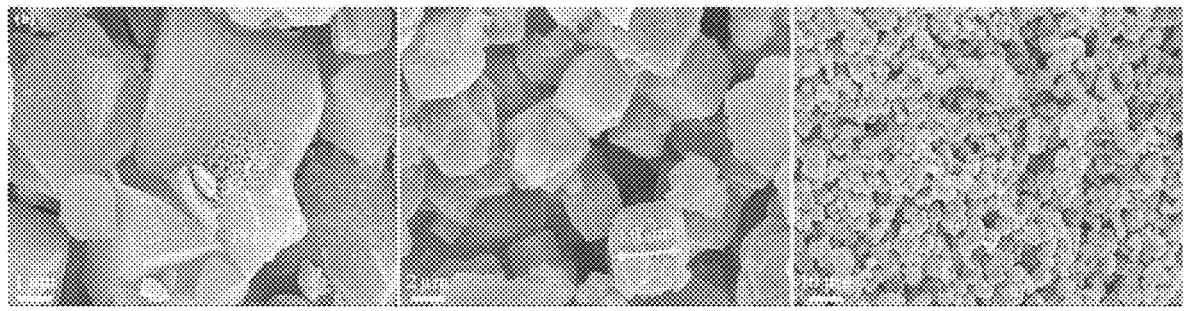
FIG. 3B illustrates SEM scans of surface morphologies of a non-limiting embodiment of an exemplary catalyst.

With reference to FIGS. 3A and 3B, the surface morphologies of the comparative catalyst (FIG. 3A) and the exemplary catalyst (FIG. 3B) were observed using a field emission scanning electron microscopy (SEM, Merlin, Carl Zeiss NTS GmbH) at 15 kV voltage. Prior to analysis, the catalysts were coated using a gold target (99.99% pure) purchased from Ted Pella, Inc. (Redding, Calif., USA).

Both the comparative catalyst (FIG. 3A) and the exemplary catalyst (FIG. 3B) included square-like crystals and nano-size pores. The nano-size pores may have derived from the burning out of binders. The pores might be helpful for the chemical reactions of feedstock vapors on the catalysts. The lateral size of cubic crystals was generally lower than 5 μm.

Fourier-Transform Infrared Spectrum (FT-IR)

The Fourier-transform infrared spectrum (FT-IR) of the catalysts were determined using a PerkinElmer FT-IR/NIR Spectrometer at room temperature. The scanning range was between 4000 cm-1 and 530 cm-1. The accumulation was 32 scans and the resolution was 2 cm-1.

Figure 4:
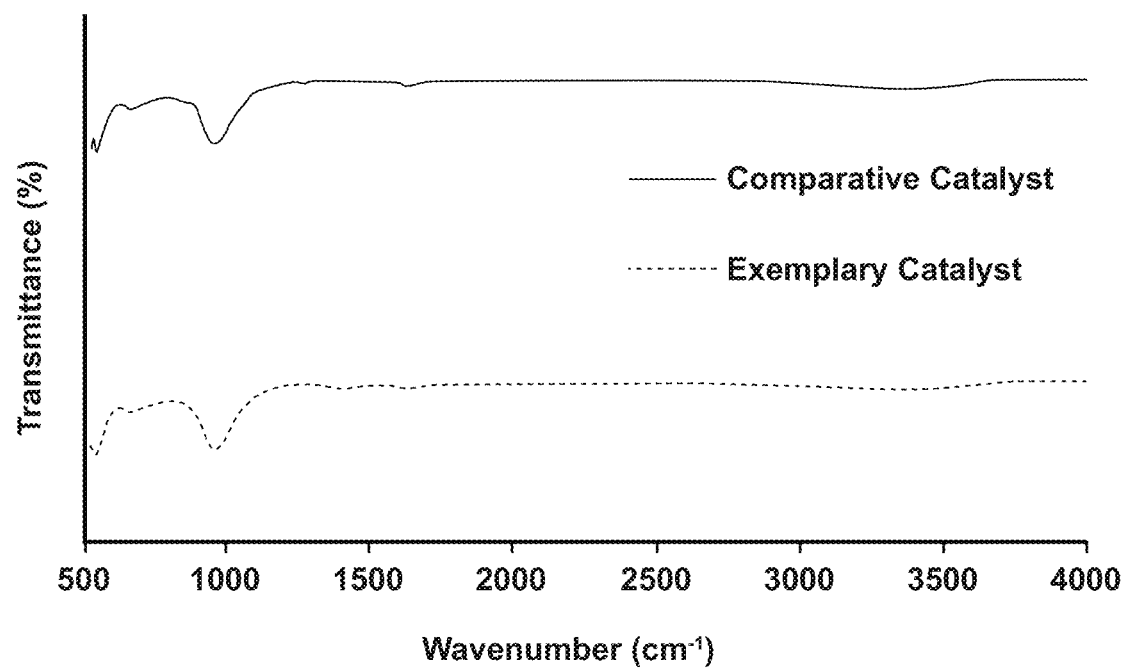
FIG. 4 illustrates a graph showing a non-limiting relationship between wavenumber and transmittance using the Fourier-transform infrared spectrum (FT-IR) of the exemplary and comparative catalysts.

Both the comparative catalyst and the exemplary catalyst exhibited peaks at approximately 3400 cm-1, 1650 cm-1, 965 cm-1, 676 cm-1, and 545 cm-1, as shown in FIG. 4. The peak at 3400 cm-1 was ascribed to O—H stretching group. The peak at 1650 cm-1 was ascribed to lattice water molecules. The peak at 545 cm-1 was ascribed to (Si/Al—O)4 bending mode. The water molecules in zeolites were ascribed to cations. The association of water molecules with cations and/or framework oxygen ions in zeolite depended on the openness of the structure. The peak at 965 cm-1 was ascribed to the symmetric stretching vibration of the Si—O—Si groups. The peak at 676 cm-1 was ascribed to the asymmetric stretching vibration of the Si—O—Si groups. These bands did not significantly change after the loading of Ni on the zeolite, indicating the zeolite framework remaining unaffected after the Ni loading. The FT-IR spectra of the comparative catalyst and the exemplary catalyst exhibited similar formation of identical chemical moieties and structural units. However, the peak at 1420 cm-1 of the exemplary catalyst was ascribed to N—H groups. This characteristic may derive from the Ni precursor: $Ni(NO_3)_2 \cdot 6H_2O$.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

What is claimed is:

1. A method of forming a catalyst, the method comprising:
   combining a binder, a support, and an active metal to form a slurry composition;
   applying the slurry composition using an additive manufacturing process to form a green part;
   exposing the green part to heat at a temperature of from about 10° C. to about 150° C. to form a hardened part; and
   applying a ceramic-based coating material to the hardened part to form the catalyst.

2. The method of claim 1, wherein combining the binder, the support, and the active metal, comprises:
   combining the binder and the active metal to form a mixture; and
   combining the mixture and the support to form the slurry composition.

3. The method of claim 1, wherein the binder comprises a cellulose-based binder, a silicate-based binder, or a combination thereof.

4. The method of claim 3, wherein the cellulose-based binder comprises hydroxyethyl cellulose, carboxymethyl cellulose, methyl cellulose, ethyl cellulose, micro-fibrillated cellulose, nanocellulose, or combinations thereof.

5. The method of claim 3, wherein the silicate-based binder comprises sodium silicate, bentonite clay, aluminate silicate, potassium silicate, lithium silicate, or combinations thereof.

6. The method of claim 3, wherein the binder comprises sodium silicate and hydroxyethyl cellulose, and wherein the mass ratio of the sodium silicate to the hydroxyethyl cellulose is from about 3.0 to about 8.0.

7. The method of claim 1, wherein the support comprises a zeolite, $SiO_2$, $Al_2O_3$, $SiO_2/Al_2O_3$, $ZrO_2$, $CeO_2$, $Ce_{0.6}Zr_{0.4}O_2$, or combinations thereof.

8. The method of claim 7, wherein the support comprises the zeolite and wherein the mass ratio of the zeolite to the binder is from about 0.1 to about 1.0.

9. The method of claim 1, wherein the active metal comprises nickel (Ni), copper (Cu), magnesium (Mg), zinc (Zn), iron (Fe), cobalt (Co), titanium (Ti), platinum (Pt), palladium (Pd), scandium (Sc), rhodium (Rh), lanthanum (La), yttrium (Y), gold (Au), or combinations thereof.

10. The method of claim 9, wherein the active metal comprises Ni(NO3)2.6H2O.

11. The method of claim 10, wherein the mass ratio of the Ni(NO3)2.6H2O to the binder is from about 1.0 to about 6.0.

12. The method of claim 1, wherein the slurry composition comprises a solvent.

13. The method of claim 12, wherein the solvent comprises ethanol, water, methanol, acetone, propanol, isopropanol, butanol, or combinations.

14. The method of claim 1, wherein the ceramic-based coating material comprises cerakote.

15. The method of claim 1, wherein applying the slurry composition using an additive manufacturing process, comprises:
    dispensing the slurry composition through a nozzle to form a first layer on a substrate, and
    dispensing the slurry composition through the nozzle to form a second layer on the first layer to form two or more layers of the green part.

16. The method of claim 1, wherein the nozzle defines an orifice having an inside diameter of from about 10 nm to about 100 mm.

17. The method of claim 1, wherein exposing the green part to heat comprises exposing the green part to heat at a temperature of from about 20° C. to about 40° C. for a time period of at least 2 hours.

18. The method of claim 1, wherein applying a coating material to the hardened part, comprises:
    spraying the hardened part with the ceramic-based coating material;
    exposing the ceramic-based coating material to heat at a temperature of from about 20° C. to about 40° C. for a time period of at least 2 hours; and
    calcining the hardened part by exposing the ceramic-based coating material to heat at a temperature of from about 450° C. to about 600° C. at a rate of from about 5° C/min to about 15° C/min to form the catalyst.

19. A method of forming a catalyst, the method comprising:
    combining a binder comprising sodium silicate and hydroxyethyl cellulose, a support, and an active metal to form a slurry composition;
    applying the slurry composition using an additive manufacturing process to form a green part;
    exposing the green part to heat at a temperature of from about 10° C. to about 150° C. to form a hardened part; and
    applying a coating material to the hardened part to form the catalyst.

* * * * *